Nov. 11, 1969     L. K. GRIFFITH     3,477,423
BIOPSY INSTRUMENT
Filed Jan. 9, 1967
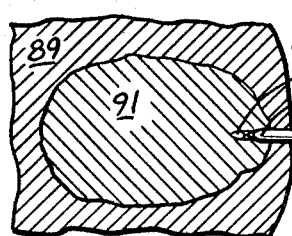
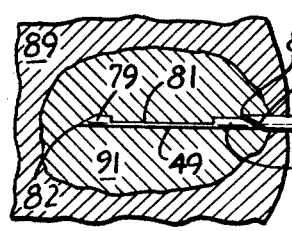
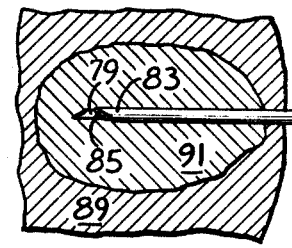
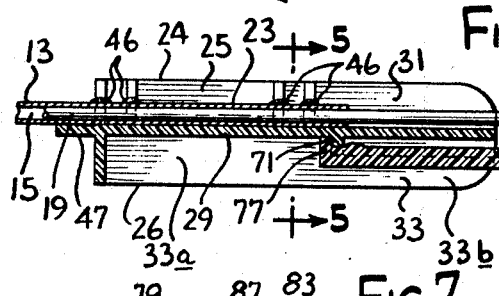
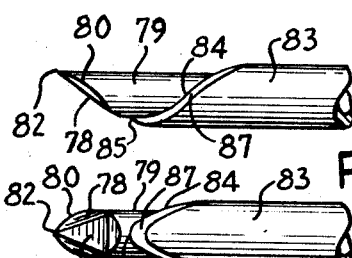
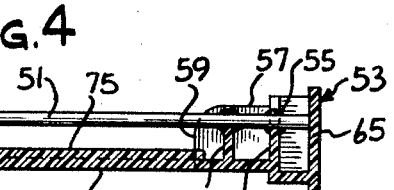
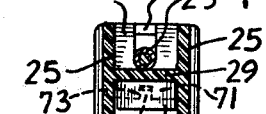
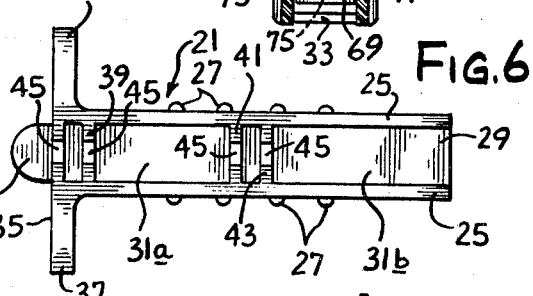
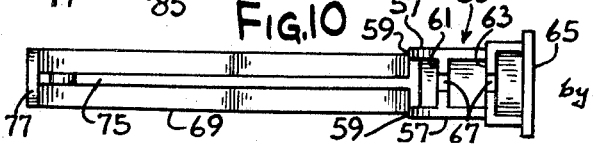
INVENTOR
LIONELL K. GRIFFITH
by: *Richard J. Leilly*
ATTYS

United States Patent Office 3,477,423
Patented Nov. 11, 1969

3,477,423
BIOPSY INSTRUMENT
Lionell K. Griffith, Chicago, Ill., assignor to Baxter Laboratories, Inc., Morton Grove, Ill., a corporation of Delaware
Filed Jan. 9, 1967, Ser. No. 608,014
Int. Cl. A61b 10/00, 17/34
U.S. Cl. 128—2                    8 Claims

ABSTRACT OF THE DISCLOSURE

An elongated obturator has a forward tissue piercing end portion with an adjacent tissue receiving pocket and is limitedly relatively reciprocative into and out of the front end of a tubular sheath with a pointed tissue severing forward end to isolate a tissue specimen in said pocket. The point of the tissue piercing end portion and the point on the sheath are secured 180° apart by guide means defining the path of relative reciprocation and the wall defining the tissue severing forward end is sloped for smooth flow of tissue about the instrument upon its penetration with said pocket closed.

---

The present invention relates to a surgical instrument for performing a subcutaneous biopsy or the like.

An instrument of the general glass with which the present invention concerns itself comprises a tubular sheath having a forward end which is adapted for extension into a subcutaneous tissue for specimen procurance. An elongated obturator is axially reciprocative within the sheath and has a tissue piercing forward end portion which is projectable from the forward end of said sheath. The forward end portion of the obturator is fashioned with a pocket or undercut part into which specimen tissue extends upon its uncovered presentation in a tissue mass beyond the forward end of the sheath. Upon relative collapsing movement of the forward and and end portion of the sheath and the obturator, specimen tissue received in the pocket will be withdrawn into the sheath. As or before the specimen tissue is drawn into the sheath, it requires severance from the specimen supplying tissue mass.

It is desirable to minimize the time required for biopsy. Prior improvements in the art have been directed toward that goal. To that end, prior constructions have been adapted for percutaneous employment and provided with improved tissue severing means. However, heretofore known devices require several rotational movements and other instrument handling which, in the light of the present disclosure, needlessly prolong biopsy. Some prior art biopsy instruments are fashioned and used in a manner such that relative rotation of an obturator and sheath is a necessary step in percutaneous biopsy.

The capital expenditure required to manufacture a biopsy instrument with relatively rotatable parts has precluded production and sale of disposable biopsy instruments. That is to say, heretofore, it has been economically unfeasible to manufacture and market disposable biopsy instruments because of the relatively large investment required for production of prior known devices. The lack of availability of disposable biopsy instruments dictates repeated uses of those extant. Incident thereto are repeated handlings required for sterilization and for sharpening of puncturing parts and cutting edges. Should a prior device be constructed in a manner such that its components are not readily separable, risk of failure to hone required parts is maximized so that cutting edges may become dull and cause associated tissue injury. To employ an available instrument made in accordance with prior teachings as a disposable article, would cost about ten times more than a sum calculated as acceptable for that purpose.

In accordance with the present invention and as an object thereof, there is provided an improved surgical instrument comprising a sheath and an obturator associated in a manner such that said instrument is adapted for biopsy.

It is an additional object of the invention to provide an instrument of the indicated class in which the requirement for relative rotation of obturator and sheath is eliminated.

It is another object of the invention to provide a biopsy instrument having its obturator and sheath arranged for minimal reciprocation to minimize the time for biopsy procedure.

It is a further object of the invention to provide a disposable surgical instrument of said class and adapted for biopsy.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a longitudinal elevational view of a surgical instrument embodying one form of the present invention and illustrating schematically the condition of said instrument immediately after the penetration of tissue for biopsy, parts broken away to conserve drawing area.

FIG. 2 is a longitudinal elevational view of said instrument at an aspect 90° from FIG. 1 and showing said instrument extended from its condition in FIG. 1 for tissue receipt, parts broken away for the same reason assigned with respect to FIG. 1.

FIG. 3 is a view of said instrument like FIG. 2, except showing said instrument conditioned after tissue specimen severance.

FIG. 4 is an enlarged longitudinal sectional view of an outer or grippable end portion of said instrument.

FIG. 5 is a transverse sectional view of said instrument taken substantially on the line 5—5 of FIG. 4 and looking in the direction of the arrows.

FIG. 6 is an enlarged longitudinal elevational view of a hub for the sheath of said instrument.

FIGS. 7, 8 and 9 are perspective views of a tissue severing end portion of said instrument taken respectively from a first aspect, a second aspect at an angular rotation of 90° from said first aspect and a third aspect angularly rotated 180° from said first aspect.

FIG. 10 is an enlarged longitudinal elevational view of a hub for the obturator of said instrument.

Referring now more particularly to the drawings, there is seen a surgical instrument generally designated 11 and adapted for biopsy. Said instrument comprises an elongated cylindrical tubular sheath 13 having an axial passage 15 (FIG. 4) which extends from end to end of said sheath. An elongated obturator 17 (FIG. 2) has a medial portion 19 (FIG. 4) which is disposed in the sheath passage 15. The proportioning of the parts is such that obturator 17 is snugly associated with sheath 13 though slidable therein for relative reciprocation longitudinally thereof upon application of slight manual pressure.

A hub generally designated 21 (FIG. 6), which may be of a rigid plastic fabrication, is securely arranged from one end portion of said sheath. To that end, in the present embodiment, hub 21 is defined by a pair of integral rigid parallel manually grippable side walls 25 having therewith fashioned gripping treads or welts 27. A shelf 29 (FIGS. 4 and 5) which may be molded with hub 21 extends transversely of side walls 25 their entire lengths. Shelf 29 is disposed medially of what, for purpose of description, is considered the top 24 and bottom 26 of side walls 25. Thereby, a top chamber 31 and a bottom chamber 33 which extend longitudinally of said hub are generated on opposite faces of said shelf.

A front wall 35 (FIG. 6) extending transversely of side walls 25 defines the forward end of said hub. Wall 35 has a pair of thickened opposite alar projections 37 which extend outwardly from the walls 25 and which are adapted as finger rests or abutments for a finger and an opposing thumb during instrument use. A plurality of partitions 39, 41 and 43 (FIG. 6) which are arranged transversely of chamber 31, serve to rigidify said hub. Partition 39 is paired with wall 35 and spaced slightly therefrom. Partitions 41 and 43 are disposed about midway between opposite ends of chamber 31 and are spaced slightly from each other. They divide chamber 31 into a forward compartment 31a and a rear compartment 31b.

Wall 35 and said partitions serve as a holder or retainer for the rear end portion 23 (FIG. 4) of sheath 13, the latter being supported in compartment 31a on shelf 29 and extending slightly into compartment 31b. To secure said sheath, said last wall and said partitions have a plurality of upwardly opening axially aligned notches 45, respectively, which are proportioned to receive sheath end portion 23 in press fit. The assembly may be additionally secured by suitable adhesive or cement 46, the character of which is appreciated by those knowledgeable in the art.

Hub 21 of the present embodiment is fashioned with a boss or tongue 47 which may be a forward projection of shelf 29 and is proportioned as a friction holder for engagement within a tubular cover (not shown) adapted for disposition about the end portions of the obturator and sheath which project forwardly from the wall 35.

The obturator has a forward end section 49 (FIG. 2) and a rear end section 51 (FIGS. 1 and 3) which project outwardly from front and rear end openings of said sheath. Rear end section 51 extends rearwardly beyond hub 21. A hub 53 (FIG. 10), preferably of hard plastic fabrication, is disposed rearwardly of and in axial alignment with hub 21. Hub 53 is rigidly secured from obturator end section 51 and comprises a pair of parallel side walls 57 with forward ends which define a pair of abutments 59. The latter are proportioned and arranged to limit relative forward motion of the hub 53 and accordingly said obturator by engagement with the rear end of shelf 29.

Hub 53 comprises a pair of parallel rigidifying partitions 61 and 63 which are spaced axially from each other and parallel to an integral transverse rear end wall 65. Partitions 61 and 63 have a pair of notches 67 which are disposed in axial alignment with each other and with the notches 45. Notches 67 are proportioned to receive the rear end section 51 of the obturator in press fit. Securance of the latter parts may be further insured by use of a suitable adhesive or cement 55 (FIG. 1) which may be similar to that used to secure together said sheath and its hub 21.

An elongated slide 69 which is preferably fashioned integrally with hub 53 projects forwardly therefrom in cantilever fashion parallel to said obturator. Slide 69 is proportioned for reciprocative sliding engagement longitudinally of hub 23 in chamber 33 whose portions of walls 25 are spaced from each other a distance which limits rocking movement or wobble of said slide. A boss 71 (FIGS. 4 and 5) fashioned integrally with hub 21 projects downwardly partially into chamber 33. Said boss is disposed transversely of walls 25 and partially divides chamber 33 into a forward compartment 33a and a rear compartment 33b. Said boss has a downwardly opening groove 73 which serves as a track for an upwardly extending rib or bead 75 formed longitudinally of said slide. Thereby, relative rotational movement of obturator and sheath is precluded.

Normally extending catch 77 (FIG. 10) is fashioned at the forward end of slide 69. Catch 77 slidingly is disposed in the compartment 33a. It is proportioned for engagement with boss 71. Thereby, rearward movement of hub 53 and accordingly said obturator is limited. Moreover, slide 69 is proportioned in a manner such that catch 77 is adapted to engage front wall 35 of hub 21 to limit forward movement of the slide as abutments 59 of the hub 53 engage the rear end of shelf 29.

A tissue piercing end 79 (FIGS. 8, 9 and 10) comprises the front end portion of said obturator forward end section 49. It defines a sloping bevelled ovate face 78 having an outer cutting edge 80 terminating in a forward piercing point 82. A tissue receiving notch or pocket 81 (FIG. 2) is formed or fashioned in said obturator front end portion adjacent and behind tissue piercing end 79. The depth and expanse of said pocket is such that it is adapted for holding a tissue specimen of adequate size for conventional examination. A shearing end 83 comprises the forward section of the sheath. It is defined by a sloping ovate shearing edge 84 which terminates in a forward point 85.

The parts are arranged so that piercing point 82 is angularly disposed 180° from point 85. Moreover, boss 71 is disposed in a manner such that point 85 cannot project beyond any part of ovate face 78 of said obturator. Furthermore, the tubular wall comprising the shearing end 83 of said sheath is secondarily fashioned with a feather or conical bevel to provide a smooth transition surface 87 to preclude the hanging up of tissue as the instrument moves percutaneously to enter tissue for biopsy in a manner hereinafter to be described.

Biopsy instrument 11 is adapted for percutaneous employment. For that purpose prior to penetration its parts preferably should be conditioned in relationship each to the other as shown in FIG. 1 with said obturator withdrawn its full extent into the sheath. In such condition only piercing end 79 projects from the forward end of said sheath. Then, with the side walls 25 manually gripped, said biopsy instrument may be rapidly plunged through skin 89 to enter a tissue mass 91, as illustrated in FIG. 1. Thereafter, hub 53 is adapted manually to be plunged forwardly by appropriate manipulation to extend the piercing point 82 and expose pocket 81 for tissue reception, as illustrated in FIG. 2. As illustrated in FIG. 3, hub 21 then manually may be plunged forwardly to move the point 85 toward point 82. During such last movement, a tissue portion which is disposed in the pocket will be severed from the main tissue mass by advancing shearing edge 84. Thereafter, the hubs 21 and 53 should be gripped to hold them in the relative condition of FIG. 3 and said biopsy instrument rapidly removed from the tissue.

The simplicity of construction of the herein described device minimizes investment in tooling, other manufacturing overhead and assembly labor so that a biopsy instrument can be available at a cost to hospitals which indicates disposability. Furthermore, the construction enables performance of a subcutaneous biopsy without requirement of initial exposure of subcutaneous tissue, a sample of which is to be procured. Additionally, the present invention permits percutaneous procurance of a tissue specimen using a technique simplified over heretofore practical procedures and requiring minimal manipulation.

What is claimed is:

1. In a biopsy instrument and the like adapted to obtain a subcutaneous tissue specimen and having an elongated tubular sheath with a forward open end portion having a tissue shearing edge defining a point-like front end, and an open opposite end portion, an elongated obturator within said sheath and arranged for axial reciprocation therein, said obturator having a tissue-piercing front end portion defining a sloping face and a front point, said obturator having a rear end portion extending outwardly from said sheath, and a pocket disposed behind said front end portion for relative reciprocation into and out of said forward end portion for tissue reception and severance, and axially aligned hub means comprising a first sub mounted on said opposite end portion and a second sub mounted on said rear end portion, the improvement comprising slide means carried by and extending forwardly from said second hub into said first hub in parallel relationship with said obturator for reciprocation in said first hub, said first hub having track defining abutment means to receive said slide means and arranged and proportioned to preclude relative rotation of said obturator and sheath over their entire range of relative reciprocative movement, and means for limiting the relative movement of said front end portion of the obturator toward said tubular sheath to prevent said sheath from projecting over the face of the obturator.

2. A biopsy instrument as defined in claim 1 in which the track defining abutment means comprise a pair of parallel walls fashioned integrally with said first hub and defining an elongated path parallel to said obturator in which said slide is reciprocative, said parallel walls spaced apart from each other a distance such that said slide is precluded from relative rotation, and a front wall across said path and proportioned and arranged to engage said slide to limit relative reciprocation of said obturator and said sheath to close and expose said pocket.

3. A biopsy instrument as defined in claim 2 in which said first hub is fashioned with a shelf disposed transversely of said parallel walls and extending longitudinally thereof, said shelf defining a first chambers opening forwardly and rearwardly and a second chamber defining said path and opening rearwardly, the opposite end portion of said sheath secured in, and the rear end portion of said obturator extending rearwardly from, said first chamber.

4. A biopsy instrument and the like adapted to obtain a subcutaneous tissue specimen and comprising a tubular sheath having a forward sloping front face with a tissue shearing edge defining a point-like front end, an elongated obturator axially reciprocative in said sheath for extension from said point-like front end and having a tissue receiving pocket adapted for presentation forwardly beyond and relative withdrawal into said sheath, said obturator having a forward tissue piercing end portion defining a sloping face and a front point, said front point disposed at an angle of rotation about 180° from said point-like front end, and retaining means arranged on the end portions of said sheath and obturator opposite said front end and said front point to preclude relative rotation thereof over their entire range of relative reciprocation and extension of said sheath beyond said forward tissue piercing end portion, and means for limiting the relative movement of the tissue piercing end portion of the obturator toward said tubular sheath to prevent said sheath from projecting over the face of the obturator.

5. A biopsy instrument as defined in claim 4 in which said front face is tapered from its tissue cutting edge in a manner such that tissue will flow over said obturator and sheath when in pocket closed condition upon tissue penetration.

6. The biopsy instrument of claim 1 in which the front point of the obturator is disposed at an angle of rotation of about 180° from said point-like front end of the sheath.

7. The biopsy instrument of claim 6 in which said pocket is disposed on the side of the obturator opposite said front point.

8. The biopsy instrument of claim 4 in which the shearing edge of the tubular sheath is defined by an annular, beveled surface about the end of said sheath in which the inner portion of said beveled surface extends axially beyond the outer portion of said surface to preclude the hanging up of tissue as said sheath and obturator move percutaneously.

References Cited

UNITED STATES PATENTS

| | | | |
|---|---|---|---|
| 614,760 | 11/1898 | Richter | 128—309 |
| 1,339,692 | 5/1920 | Diamant | 128—309 |
| 1,585,934 | 5/1926 | Muir | 128—2 |
| 1,867,624 | 7/1932 | Hoffman | 128—2 |
| 2,496,111 | 1/1950 | Turkel | 128—2 |
| 2,705,949 | 4/1955 | Silverman | 128—2 |
| 3,001,522 | 9/1961 | Silverman | 128—2 |
| 3,175,554 | 3/1965 | Stewart | 128—2 |

FOREIGN PATENTS

| | | |
|---|---|---|
| 1,267,960 | 6/1961 | France. |
| 142,879 | 11/1953 | Sweden. |

RICHARD A. GAUDET, Primary Examiner

KYLE L. HOWELL, Assistant Examiner

U.S. Cl. X.R.

128—347